(12) United States Patent
Tauk et al.

(10) Patent No.: US 9,494,791 B1
(45) Date of Patent: Nov. 15, 2016

(54) FLUIDS FOR AN ELECTROWETTING DEVICE

(71) Applicant: Amazon Technologies, Inc., Seattle, WA (US)

(72) Inventors: Lara Tauk, Eindhoven (NL); Romaric Mathieu Massard, Eindhoven (NL)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/557,102

(22) Filed: Dec. 1, 2014

(51) Int. Cl.
*G02B 26/00* (2006.01)
*G02B 1/06* (2006.01)
*B32B 37/18* (2006.01)
*B32B 37/00* (2006.01)

(52) U.S. Cl.
CPC ......... *G02B 26/005* (2013.01); *B32B 37/0038* (2013.01); *B32B 37/18* (2013.01); *G02B 1/06* (2013.01); *B32B 2457/20* (2013.01)

(58) Field of Classification Search
CPC .... G02B 26/005; G02B 26/004; G02B 1/06; G09G 3/3433; G09G 2300/0426; B32B 37/18; B32B 2457/20; B32B 37/0038
USPC ....... 359/245, 228, 253, 290–292, 315, 318, 359/665; 345/41, 48, 60, 84, 204; 349/1, 12
See application file for complete search history.

(56) References Cited

U.S. PATENT DOCUMENTS

2013/0321895 A1\* 12/2013 Naito .................. G02B 26/005
359/290

\* cited by examiner

*Primary Examiner* — Tuyen Tra
(74) *Attorney, Agent, or Firm* — Lee & Hayes, PLLC

(57) ABSTRACT

An electrowetting device comprises a first support plate and a second support plate, pixel regions between the first support plate and the second support plate, pixel walls on the first support plate that delineate the pixel regions from one another, and an electrolyte solution between the first support plate and the second support plate. The electrolyte solution includes an adsorbent.

20 Claims, 4 Drawing Sheets

PLACE AN ELECTROLYTE SOLUTION ON A FIRST SUPPORT PLATE, WHEREIN THE ELECTROLYTE SOLUTION INCLUDES A DESICCANT, AND THE FIRST SUPPORT PLATE INCLUDES A FIRST ELECTRODE LAYER AND PIXEL WALLS ON THE FIRST ELECTRODE LAYER
502

PLACE A SECOND SUPPORT PLATE OVER THE ELECTROLYTE SOLUTION, WHEREIN THE SECOND SUPPORT PLATE INCLUDES A SECOND ELECTRODE LAYER
504

FLUIDS FOR AN ELECTROWETTING DEVICE

BACKGROUND

Electronic displays are found in numerous types of electronic devices such as electronic book ("eBook") readers, cellular telephones, smart phones, portable media players, tablet computers, wearable computers, laptop computers, netbooks, desktop computers, televisions, appliances, home electronics, automotive electronics, augmented reality devices, and so forth. Electronic displays may present various types of information, such as user interfaces, device operational status, digital content items, and the like, depending on the kind and purpose of the associated device. The appearance and quality of a display may affect a user's experience with the electronic device and the content presented thereon. Accordingly, finding ways to enhance user experience and satisfaction continues to be a priority. Moreover, increased multimedia use imposes high demands on designs, packaging, and fabricating display devices, as content available for mobile use becomes more extensive and device portability continues to be a high priority.

An electrowetting device, such as a display, includes an array of pixels individually bordered by pixel walls that retain liquid, such as opaque oil, for example. Light transmission through each pixel is adjustable by electronically controlling a position of the liquid in the pixel. For instance, resolution and quality of an electrowetting display may depend on a number of factors, such as optical transmissivity or reflectivity of material layers of the electrowetting display and pixel size, just to name a few examples.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
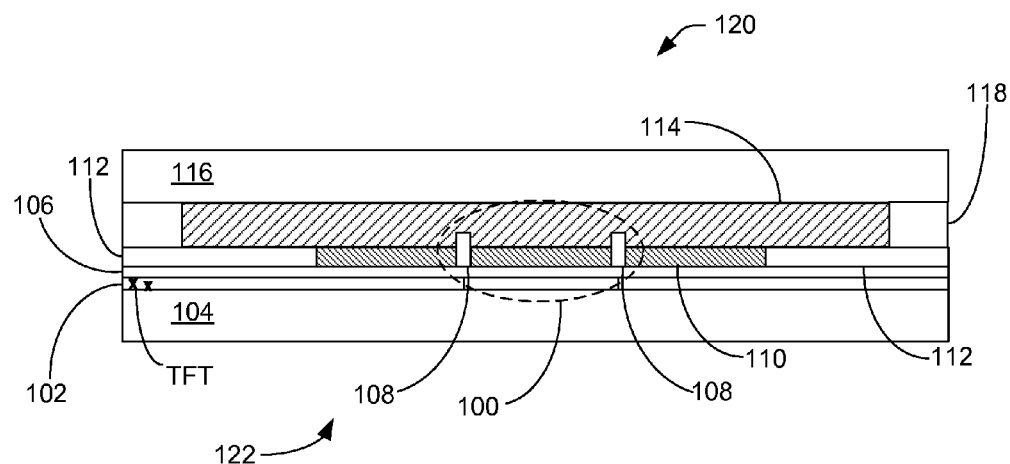
FIG. 1 illustrates a cross-section of a portion of an electrowetting device, according to some embodiments.

In various embodiments described herein, electronic devices include electrowetting displays for presenting content and other information. In some examples, the electronic devices may include one or more components associated with the electrowetting display, such as a touch sensor component layered atop the electrowetting display for detecting touch inputs, a front light or back light component for lighting the electrowetting display, and/or a cover layer component, which may include antiglare properties, antireflective properties, anti-fingerprint properties, anti-cracking properties, and the like. Various embodiments described herein include techniques for assembling electronic devices including these components for the electrowetting displays and other features described herein.

An electrowetting device may be any of a number of devices that include electrowetting pixels. Examples of electrowetting devices include displays, lenses, windows, mirrors, and so on.

In some embodiments, an electrowetting device includes a bottom support plate and a top support plate and a plurality of pixel regions therebetween. Individual pixel regions may include a hydrophobic surface on the bottom support plate, a first fluid on the hydrophobic surface, and a second fluid at least partially surrounding the first fluid. For example, the first fluid may be an electrowetting oil and the second fluid may be an electrolyte solution. The hydrophobic surface may comprise a hydrophobic amorphous fluoropolymer (AF), for example. Hydrophobicity refers to a degree to which a material is hydrophobic to another material. Even though a material may be called "hydrophobic", such a material can be more accurately described by its hydrophobicity, or how hydrophobic it is toward another material, for example. Thus, herein, even though a material is called hydrophobic, the hydrophobicity of the material may be less than 100% (e.g., it does not mean that the material is 100% hydrophobic).

In various embodiments, the first fluid and/or the second fluid may include an adsorbent, such as a desiccant. For example, such an adsorbent may comprise nano-zeolites, which may be in a solid state and dispersed in the second fluid, such as an electrolyte solution as a colloid. Including an adsorbent in fluids of an electrowetting device may provide a number of benefits. For example, an electrolyte solution in an electrowetting device may include impurities such as water that may be detrimental to operation and/or lifetimes of the electrowetting device. An adsorbent may adsorb such impurities so that the impurities cease to have detrimental effects on the electrowetting device. Such adsorbing may be an in-situ process that occurs before and/or after the electrolyte solution is incorporated into an electrowetting device. Generally, adsorption is the adhesion of atoms, ions, or molecules from a gas, liquid, or dissolved solid to a surface. For example, adsorption is a surface-based process, in contrast to absorption, which involves the whole volume of a material.

In a number of embodiments, an electrowetting device may be a transmissive, reflective or transflective device that generally includes an array of pixels (e.g., pixels or subpixels) configured to be operated by an active matrix addressing scheme. For example, rows and columns of electrowetting elements are operated by controlling voltage levels on a plurality of source lines and gate lines. In this fashion, the device may produce an image by selecting particular pixels to transmit, reflect or block light. Display elements may be addressed (e.g., selected) via rows and columns of the source lines and gate lines that are electrically connected to transistors (e.g., used as switches) included in each pixel. Transistors take up a relatively small fraction of the area of each pixel to allow light to efficiently pass through (or reflect from) the pixel. Herein, a pixel may, unless otherwise specified, comprise a pixel or subpixel of an electrowetting device. Such a pixel or subpixel may be the smallest light transmissive, reflective or transflective element of a display that is individually operable to directly control an amount of light transmission through or reflection from the element. For example, in some implementations, a pixel may be a pixel that includes a red subpixel, a green subpixel, and a blue subpixel. In other implementations, a pixel may be a smallest component, e.g., the pixel does not include any subpixels.

Electrowetting displays include an array of pixels comprising pixels and/or subpixels sandwiched between two support plates, such as a bottom support plate and a top plate. For example, the bottom support plate in cooperation with the top plate may contain pixels that include electrowetting oil, electrolyte solution and pixel walls between the support plates. Support plates may include glass, plastic (e.g., a transparent thermoplastic such as PMMA or other acrylic), or other transparent material and may be made of a rigid or flexible material, for example.

Hereinafter, example embodiments include reflective electrowetting displays that include a clear top support plate and a bottom support plate, which need not be transparent. The clear top support plate may comprise glass or any of a number of transparent materials, such as plastic, quartz, semiconductors, and so on, and claimed subject matter is not limited in this respect. "Top" and "bottom", as used herein to identify the support plates of an electrowetting display, do not necessarily refer to a direction referenced to gravity or to a viewing side of the electrowetting display. Also, as used herein for sake of convenience of describing example embodiments, the top support plate is that through which viewing of pixels of a (reflective) electrowetting display occurs.

In some embodiments, a reflective electrowetting display comprises an array of pixels sandwiched between a bottom support plate and a top support plate. The bottom support plate may be opaque while the top support plate is transparent. Herein, describing an element or material as being "transparent" means that the element or material may transmit a relatively large fraction of the light incident upon it. For example, a transparent support plate or layer may transmit more than 70% or 80% of the light impinging on its surface, though claimed subject matter is not limited in this respect.

Pixel walls retain at least a first fluid which is electrically non-conductive, such as opaque or colored oil, in the individual pixels. A cavity formed between the support plates is filled with the first fluid (e.g., retained by pixel walls) and a second fluid (e.g., considered to be an electrolyte solution) that is electrically conductive or polar. The second fluid may be transparent, but may be colored, or light-absorbing. The second fluid may include an adsorbent such as nano-zeolites. The second fluid may be immiscible with the first fluid.

In some embodiments, individual reflective electrowetting pixels may include a reflective layer on the bottom support plate of the electrowetting pixel, a transparent electrode layer adjacent to the reflective layer, and a hydrophobic layer on the electrode layer. Pixel walls of each pixel, the hydrophobic layer, and the transparent top support plate at least partially enclose a liquid region that includes an electrolyte solution and an opaque liquid, which is immiscible with the electrolyte solution. An "opaque" liquid, as described herein, is used to describe a liquid that appears black to an observer. For example, an opaque liquid strongly absorbs a broad spectrum of wavelengths (e.g., including those of red, green and blue) in the visible region of electromagnetic radiation. In some implementations, the opaque liquid is a nonpolar electrowetting oil.

The opaque liquid is disposed in the liquid region. As described in detail below, coverage area of the opaque liquid on the bottom hydrophobic layer is electronically adjustable to affect the amount of light incident on the reflective electrowetting display that reaches the reflective material at the bottom of each pixel.

In addition to pixels, spacers and edge seals may also be located between two support plates. Support plates may comprise any of a number of amorphous materials, such as plastic, glass, quartz, semiconductors, and so on, and claimed subject matter is not limited in this respect.

Spacers and edge seals which mechanically connect a first support plate with a second overlying support plate, or which form a separation between the first support plate and the second support plate, contribute to mechanical integrity of the electrowetting display. Edge seals, for example, being disposed along a periphery of an array of electrowetting device elements, may contribute to retaining (e.g., first and second) fluids between the first support plate and the second overlying support plate. Spacers are desirably transparent so as to not hinder throughput of light in the electrowetting display. Transparency of spacers may at least partially depend on the refractive index of the spacer material, which should be similar to or the same as the refractive indices of surrounding media. Spacers are also desirably chemically inert to surrounding media.

In some embodiments, an electrowetting device as described herein may comprise a portion of a system that includes one or more processors and one or more computer memories, which may reside on a control board, for example. Display software may be stored on the one or more memories and may be operable with the one or more processors to modulate light that is received from an outside source (e.g., ambient room light) or out-coupled from a light guide of the display device. For example, display software may include code executable by a processor to modulate optical properties of individual pixels of the electrowetting display based, at least in part, on electronic signals representative of image or video data. The code may cause the processor to modulate the optical properties of pixels by controlling electrical signals (e.g., voltages, currents, fields, and so on) on, over, or in layers of the electrowetting display.

FIG. 1 is a cross-section of a portion of a reflective electrowetting device illustrating several electrowetting pixels 100, according to some embodiments. Though three such electrowetting pixels are illustrated, an electrowetting device may include any number (usually a very large number, such as thousands or millions) of electrowetting pixels. An electrode layer 102 is formed on a support plate 104. Herein, unless a configuration is described in a particular way, a first element being "on" or "disposed on" a second element does not necessarily imply that the first element is directly on the second element with no intervening layer. For example, a first element being "on" or "disposed on" a second element may mean that the first element is directly on the second element or that other elements separate the first element from the second element. Descriptions herein provide enough detail to allow one to determine the meaning of "on" or "disposed on" for particular embodiments.

In various embodiments, electrode layer 102 may be connected to any number of thin film transistors (TFTs) that are switched to either select or deselect electrowetting pixels 100 using active matrix addressing, for example. A TFT is a particular type of field-effect transistor that includes thin films of an active semiconductor layer as well as a dielectric layer and metallic contacts over a supporting (but non-conducting) support plate, which may be glass or any of a number of other transparent or non-transparent materials, for example.

In some implementations, a dielectric barrier layer (not illustrated in FIG. 1) may at least partially separate electrode layer 102 from a hydrophobic layer 106 also formed on support plate 104. Such separation may, among other things, prevent electrolysis occurring through hydrophobic layer 106. In some implementations, hydrophobic layer 106 may comprise any of a number of types of amorphous fluoropolymers, such as AF1600, produced by DuPont, based in Wilmington, Del. Hydrophobic layer 106 may also be any of a number of water-repelling materials that affect wettability of an adjacent material, for example.

Pixel walls 108 form a patterned electrowetting element grid on hydrophobic layer 106. Pixel walls 108 may comprise a photoresist material such as, for example, epoxy-based negative photoresist SU-8. The patterned electrowetting element grid comprises rows and columns that form an array of electrowetting pixels. For example, an electrowetting pixel may have a width and length in a range of about 50 to 500 microns.

A first fluid 110, which may have a thickness (e.g., depth) in a range of about 1 to 10 microns, for example, overlies hydrophobic layer 106. First fluid 110 is partitioned by pixel walls 108 of the patterned electrowetting element grid. An outer rim 112 may comprise the same material as pixel walls 108. A second fluid 114, such as an electrolyte solution, overlies first fluid 110 and pixel walls 108 of the patterned electrowetting element grid. An electrolyte solution may be electrically conductive and/or polar. First fluid 110 may be immiscible with second fluid 114.

First fluid 110 and/or second fluid 114 may include an adsorbent, such as nano-zeolites. Such an adsorbent may adsorb impurities, such as water, from first fluid 110 and/or second fluid 114. In some cases, impurities such as water mixed with an electrolyte solution may penetrate through hydrophobic layer 106 to electrode layer 102. Water may lead to damage (e.g., oxidization or corrosion) of electrode layer 102. Less than a fraction of a percent of water in an electrolyte solution may pose such problems. A colloidal suspension of nano-zeolites in the electrolyte solution may adsorb water from the electrolyte solution and help to avoid such damage or other adverse effects of water.

A support plate 116 covers second fluid 114 and edge seals 118 maintain second fluid 114 over the electrowetting pixel array. Support plate 116 may be supported by edge seals 118 and spacers (not illustrated) that extend up to support plate 116 and are interspersed throughout the array of pixels 100. The support plate may be made of glass or polymer and may be rigid or flexible, for example. In some implementations, TFTs (not shown) are fabricated onto support plate 104

A voltage applied across, among other things, second fluid 114 and hydrophobic layer 106 of individual electrowetting pixels may control transmittance or reflectance of the individual electrowetting pixels.

The reflective electrowetting device has a viewing side 120 on which an image formed by the electrowetting device may be viewed, and a rear side 122. Support plate 116 faces viewing side 120 and support plate 104 faces rear side 122. The reflective electrowetting device may be a segmented display type in which the image is built up of segments. The segments may be switched simultaneously or separately. Each segment includes one electrowetting pixel 100 or a number of electrowetting pixels 100 that may be neighboring or distant from one another. Electrowetting pixels 100 included in one segment are switched simultaneously, for example. The electrowetting device may also be an active matrix driven display type or a passive matrix driven display, just to name a few examples.

As mentioned above, second fluid 114 may be immiscible with first fluid 110. Herein, substances are immiscible with one another if the substances do not substantially form a solution. Second fluid 114 is electrically conductive and/or polar. In some implementations, second fluid 114 may include an adsorbent. Second fluid 114 is preferably transparent, but may be colored or absorbing. First fluid 110 is electrically non-conductive and may for instance be an alkane like hexadecane or (silicone) oil.

Hydrophobic layer 106 is arranged on support plate 104 to create an electrowetting surface area. The hydrophobic character causes first fluid 110 to adhere preferentially to support plate 104 since first fluid 110 has a higher wettability with respect to the surface of hydrophobic layer 106 than second fluid 114. Wettability relates to the relative affinity of a fluid for the surface of a solid. Wettability increases with increasing affinity, and it may be measured by the contact angle formed between the fluid and the solid and measured internal to the fluid of interest. For example, such a contact angle may increase from relative non-wettability of more than 90° to complete wettability at 0°, in which case the fluid tends to form a film on the surface of the solid.

First fluid 110 absorbs at least a part of the optical spectrum. First fluid 110 may be transmissive for a part of the optical spectrum, forming a color filter. For this purpose, the fluid may be colored by addition of pigment particles or dye, for example. Alternatively, first fluid 110 may be black (e.g., absorbing substantially all parts of the optical spectrum) or reflecting. Hydrophobic layer 106 may be transparent or reflective. A reflective layer may reflect the entire visible spectrum, making the layer appear white, or part of it, making it have a color.

If a voltage is applied across electrowetting pixel 100, electrowetting pixel 100 will enter into an active state. Electrostatic forces will move second fluid 114 toward electrode layer 102, thereby displacing first fluid 110 from the area of hydrophobic layer 106 to pixel walls 108 surrounding the area of hydrophobic layer 106, to a droplet-like form. Such displacing action uncovers first fluid 110 from the surface of hydrophobic layer 106 of electrowetting pixel 100.

If the voltage across electrowetting pixel 100 is returned to an inactive signal level of zero or a value near to zero, electrowetting pixel 100 will return to an inactive state, where first fluid 110 flows back to cover hydrophobic layer 106. In this way, first fluid 110 and second fluid 114 form at least part of an electrically controllable optical switch in each electrowetting pixel 100. Of course, such details of an electrowetting device are merely examples, and claimed subject matter is not limited in this respect.

Figure 2:
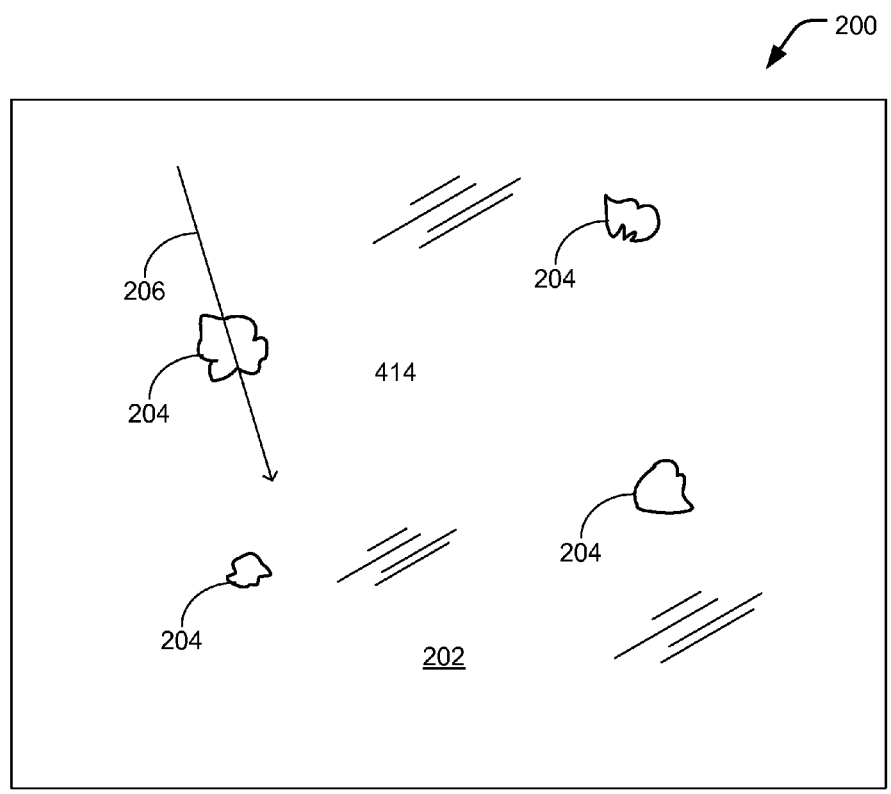
FIG. 2 illustrates a portion of an electrolyte solution that includes an adsorbent, according to various embodiments.

FIG. 2 illustrates a portion 200 of a second fluid, such as an electrolyte solution 202 of an electrowetting device, where electrolyte solution 202 includes an adsorbent 204, according to various embodiments. For example, portion 200 may be a (microscopic) portion of second fluid 114 illustrated in FIG. 1. Electrolyte solution may comprise, among a number of other possibilities, a polyether; a peroxide; a polyol such as a diol, a triol and/or a tetraol; an ether; dioxolane; dimethoxymethane; an amide; a polyamide; a carboxylic acid; formic acid; acetic acid; propanoic acid; glycolic acid; a heteroatom substituted carboxylic acid; a halogenated carboxylic acid; chloroacetic acid; trifluoroacetic acid; a dicarboxylic acid; oxalic acid; malonic acid; succinic acid; and/or glutaric acid; a tricarboxylic acid; citric acid; aconitic acid; an ester; methyl acetate; ethyl lactate; a sulphone; dimethyl sulphate; dimethyl sulphite; methylsulphonylmethane; an aldehyde; acetaldehyde; glyoxal; methylglyoxal; a peroxide; methyl ethyl ketone peroxide; oxamic acid; organosulphoxide; ethylene carbonate; propylene carbonate; diethylene glycol; polyethylene glycol; propylene glycol; erythritol; ethylene glycol; glycerol; butanetriol; derivatives thereof; or combinations thereof. In a particular example, adsorbent 204 may comprise nano-zeolites, which may be generally dispersed in electrolyte solution 202. Hereinafter, example embodiments and implementations focus on adsorbent 204 comprising nano-zeolites, though adsorbent 204 may be any of a number of other adsorbent materials, and claimed subject matter is not so limited.

In some implementations, adsorbent 204 may be a getter, which is a reactive or adsorbing material used to remove impurities, such as water from electrolyte solution 202. A concentration of nano-zeolites in electrolyte solution 202 may be less than about 10 grams per liter.

Nano-zeolites may have average particle-sizes in a range from about 40 nanometers up to about 300 nanometer and have average pore sizes in a range from about 3 angstroms up to about 10 angstroms. Pores of nano-zeolites include channels and cavities on the surface of nano-zeolite particles. Such pores have an affinity for water molecules so that nano-zeolites are able to adsorb water from electrolyte solution 202.

Generally, zeolites may be micro-porous, aluminosilicate minerals that may be used as commercial adsorbents and catalysts, for example. Zeolites, however, need not include aluminosilicates. Zeolites may have a porous structure that can accommodate a wide variety of cations, such as Na+, K+, Ca2+, Mg2+, and others. These positive ions are rather loosely held and can readily be exchanged for others in a contact solution, for example. Some of the more common mineral zeolites are analcime, chabazite, clinoptilolite, heulandite, natrolite, phillipsite, and stilbite. An example mineral formula is: Na2Al2Si3O10.2H2O, the formula for natrolite. Claimed subject matter, however, is not limited to such examples of zeolites.

The pore structures of nano-zeolites have a relatively high specific surface area (e.g., surface area per mass unit), which may be comparable to active carbon, for example. This high surface area may be used to adsorb specific molecules from the surrounding environment with relatively rapid adsorption kinetics. These properties are beneficial for adsorbing water from an electrolyte solution. Nano-zeolites, or other substantially adsorbent material, may comprise pores and channels that are permeable to liquids or gases. Nano-zeolites are thermally and mechanically stable (e.g., stable up to several hundred degrees centigrade and pressures up to about 100 bar) and are non-toxic and environmentally safe.

Nano-zeolites to be mixed into an electrolyte solution may be produced with a relatively precise control over particle-size distribution and range, pore structure, and diameter, for example. Nano-zeolite particles are available in powder form, as suspensions, or dispersed into organic matrices.

Desiccant 204, such as nano-zeolites, may be optically transparent. For example, a refractive index of nano-zeolites (or other adsorbent) may be at least approximately the same as a refractive index of electrolyte solution 202. In particular, the refractive index of nano-zeolites may be about 1.49 and a refractive index of electrolyte solution 202 may be about 1.45.

Such similarity of refractive indices provides a benefit in optical performance of the electrowetting device in that particles of nano-zeolites may be invisible to a viewer of the electrowetting device. For example, a light ray 206 is illustrated to be un-deflected as light ray travels through a particle of adsorbent 204. Generally, upon traveling through an interface between two different materials, light bends based, at least in part, on a difference between refractive indices of the two materials. In the case where the refractive index of nano-zeolites are the same as or similar to the refractive index of electrolyte solution 202, light bending will not occur at their interface. In some embodiments, a refractive index of nano-zeolites (or other adsorbent) may be different from the refractive index of electrolyte solution 202. Such a difference may lead to bending of light rays resulting in diffusion of light as the light travels through the electrolyte solution 202 and adsorbent 204.

In some implementations, adsorbent 204 may comprise a core-shell material. For example, a core-shell material may comprise semiconducting nanocrystals, which are a class of materials having properties intermediate between those of small, individual molecules and those of bulk, crystalline semiconductors. The core and the shell may comprise type II-VI, IV-VI, and III-V semiconductors, with configurations such as CdS/ZnS, CdSe/ZnS, CdSe/CdS, and InAs/CdSe (typical notation is: core/shell), just to name a few examples. A particular example of a core-shell material is a product called nCap, manufactured by NanoScape of Munich, Germany. nCap is a core-shell material, comprising particles that are a porous (meso-porous) silicate core surrounded by a porous inorganic shell. These particles can be modified through a second, polymeric shell or by surface functionalization. Their core-shell structure allows a controlled release of substances which are stored (encapsulated) within the porous core. nCap particles are available in sizes ranging from about 200 nanometers up to about 7 micrometers with well-defined particle-size distributions.

In some implementations, adsorbent 204 may comprise a product called nBeads, manufactured by NanoScape of Munich, Germany. nBeads are composite materials comprising a mixture of porous inorganic (zeolite) particles and a porous organic (hydrophobic) polymer, formed into a well-defined spherical bead. By altering the type of zeolite and polymer used, the porosity and chemical nature of the beads may be varied. nBeads are typically around 400 micrometers in size with a hierarchical pore structure (micro-porous within the zeolite; meso-porous within the composite bead). Due in part to their porosity and pore structure, nBeads have a large internal surface area, for example.

Figure 3:
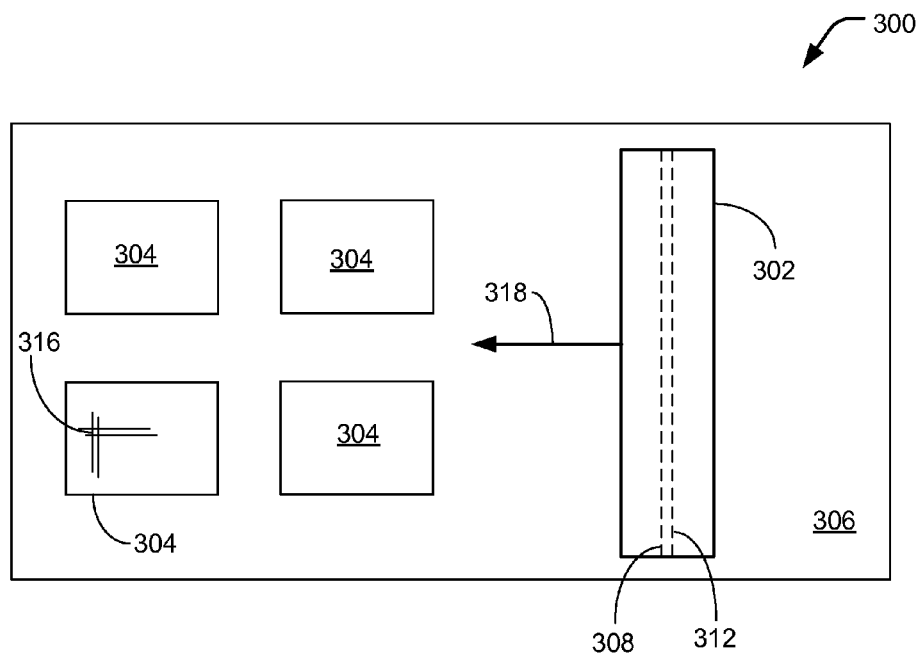
FIG. 3 is a top view of a dual fluid dispenser and a batch of bottom support plates for electrowetting devices, according to some embodiments.
Figure 4:
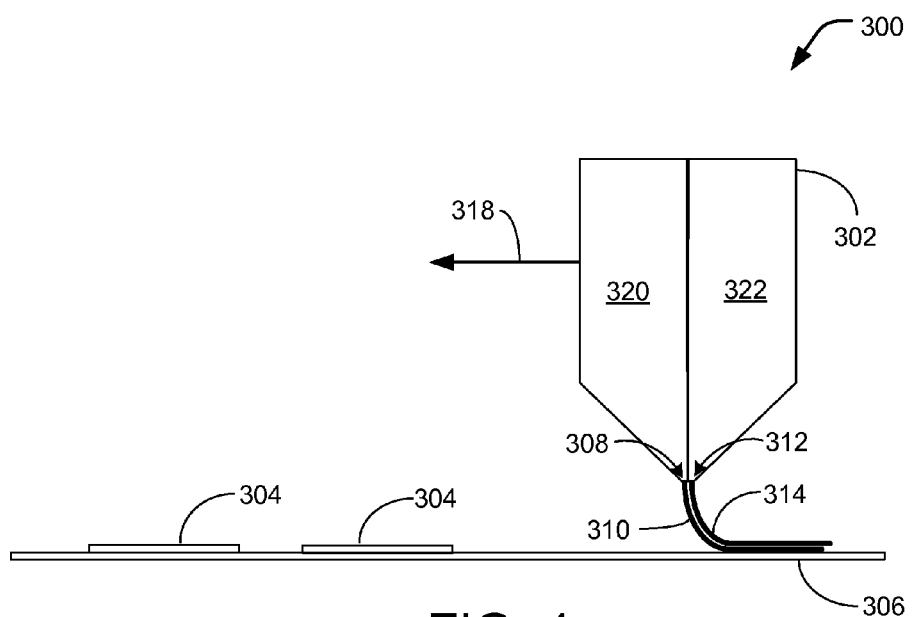
FIG. 4 is a side view of a dual fluid dispenser and a batch of bottom support plates for electrowetting devices, according to some embodiments.

FIG. 3 is a top view and FIG. 4 is a side view of a slit-coating fabrication system 300 including a fluid dispenser 302 and a batch of bottom support plates 304 for electrowetting devices, according to some embodiments. Bottom support plates 304 may be disposed on a platform 306, which may be on a conveyor system in one implementation.

During a fabrication process for placing electrowetting fluids in arrays of pixels formed on bottom support plates 304, fluid dispenser 302 moves in a particular direction relative to bottom support plates 304, which may be supported by platform 306. Motion of fluid dispenser 302 is relative to platform 306. In other words, during fabrication fluid dispenser 302 moves in a direction relative to platform 306 or platform 306 moves in an opposite direction relative to fluid dispenser 302. Fluid dispenser 302 dispenses a first fluid, such as electrowetting oil, into individual pixels which retain the first fluid within their respective pixel walls. Fluid dispenser 302 also dispenses a second fluid, such as an electrolyte solution including an adsorbent so as to cover the first fluid and the individual pixels.

In some embodiments, fluid dispenser 302 may include a first slit 308 for dispensing an electrowetting oil 310 and a second slit 312 for dispensing an electrolyte solution 314 including an adsorbent.

Bottom support plates 304 include a relatively large number of individual pixels 316 (e.g., pixels) partitioned by pixel walls (not illustrated in FIGS. 3 and 4). Fabrication system 300 may fabricate electrowetting devices in a batch process where bottom support plates 304 become a part of the electrowetting devices (e.g., as a support plate such as 104 illustrated in FIG. 1). Fluid dispenser 302 may be placed over platform 306 in preparation for dispensing electrowetting fluids (e.g., electrowetting oil 310 and electrolyte solution 314 including an adsorbent) onto platform 306 and bottom support plates 304. If fluid dispenser 302 is set into motion toward bottom support plates 304, as indicated by arrow 318, fluid dispenser 302 dispenses electrowetting oil 310 from slit 308 and electrolyte solution 314 including an adsorbent from slit 312 onto platform 306 and bottom support plates 304.

In particular, fluid dispenser 302 dispenses the electrowetting fluids as the fluid dispenser moves over platform 306 and bottom support plates 304. Electrowetting oil 310 is dispensed relatively uniformly by the fluid dispenser so that the electrowetting oil at least partially and evenly fills individual pixels 312. The electrolyte solution 314 including an adsorbent subsequently covers the electrowetting oil, fills the pixels 312, and covers the pixel walls of the pixels.

In some implementations, electrowetting oil 310 may be transiently contained in first reservoir 320 and electrolyte solution 314 including an adsorbent may be transiently contained in second reservoir 322. A distance between first slit 308 and second slit 312 may be on the order of several millimeters, for example, though claimed subject matter is not limited in this respect. Lengths (e.g., as measured into and out of the page of FIG. 4) of first slit 308 and second slit 312 may range from several centimeters to about 40 centimeters, just to give some examples. In particular, the lengths of the slits are sufficient to at least approximately span the width of platform 306 onto which fluid dispenser 302 dispenses the electrowetting fluids.

Figure 5:
FIG. 5 is a flow diagram of a process for fabricating an electrowetting device, according to various example embodiments.

FIG. 5 is a flow diagram of a process 500 for fabricating an electrowetting device, according to various example embodiments. For example, such an electrowetting device may be similar to or the same as that shown in FIG. 1. Process 500 may be performed by a fabricator, which may be automatic fabrication equipment, humans, or both. At block 502, the fabricator may place an electrolyte solution on a first support plate using a fluid dispenser such as 302 illustrated in FIGS. 3 and 4, for example. The electrolyte solution includes an adsorbent and the first support plate includes a first electrode layer and pixel walls on the first electrode layer. In some implementations, the fabricator may mix the electrolyte solution and the adsorbent to form a colloidal mixture that will be placed on the first support plate. In other implementations, the fabricator may receive a pre-mixed electrolyte solution and adsorbent from a supplier, for example. At block 504, the fabricator may place a second support plate over the electrolyte solution. The second support plate includes a second electrode layer.

Figure 6:
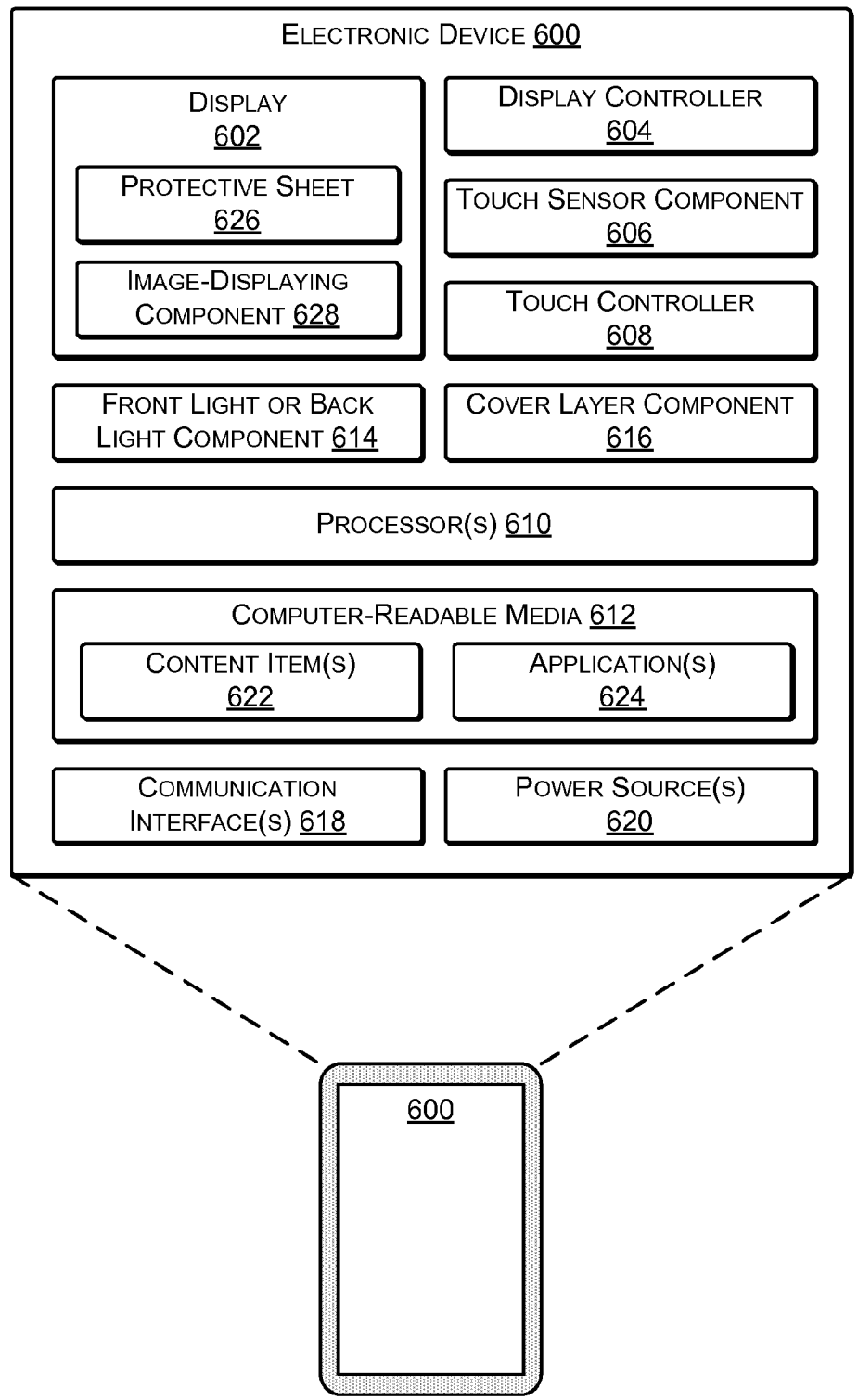
FIG. 6 illustrates an example electronic device that may incorporate a display device, according to some embodiments.

FIG. 6 illustrates an example electronic device 600 that may incorporate any of the electrowetting devices discussed above. The device 600 may comprise any type of electronic device having a display, for example. For instance, the device 600 may be a mobile electronic device (e.g., an electronic book reader, a tablet computing device, a laptop computer, a smart phone or other multifunction communication device, a portable digital assistant, a wearable computing device, an automotive display, etc.). Alternatively, the device 600 may be a non-mobile electronic device (e.g., a computer display, a television, etc.). In addition, while FIG. 6 illustrates several example components of the electronic device 600, it is to be appreciated that the device 600 may also include other conventional components, such as an operating system, system busses, input/output components, and the like. Further, in other examples, such as in the case of a television or computer monitor, the electronic device 600 may only include a subset of the components illustrated.

Regardless of the specific implementation of the electronic device 600, the device 600 includes a display 602 and a corresponding display controller 604. The display 602 may represent a reflective or transmissive display in some instances, such as an electronic paper display, a reflective or transmissive LCD display, or the like. Electronic paper displays represent an array of display technologies that largely mimic the look of ordinary ink on paper. In contrast to conventional backlit displays, electronic paper displays typically reflect light, much as ordinary paper does. In addition, electronic paper displays are often bi-stable, meaning that these displays are capable of holding text or other rendered images even if very little or no power is supplied to the display. Some examples of the display 602 that may be used with the implementations described herein include bi-stable LCD displays, micro electromechanical system (MEMS) displays, such as interferometric modulator displays, cholesteric displays, electrophoretic displays, electrofluidic pixel displays, electrowetting displays, photonic ink displays, gyricon displays, and the like. In other implementations, or for other types of devices 600, the display 602 may be an active display such as a fluid crystal display, a plasma display, a light emitting diode display, an organic light emitting diode display, and so forth. Accordingly, implementations herein are not limited to any particular display technology.

In an implementation, the display comprises an electrowetting display that employs an applied voltage to change the surface tension of a fluid in relation to a surface. For example, such an electrowetting display may include the array of pixels 100 illustrated in FIG. 1, though claimed subject matter is not limited in this respect. The electrowetting display may comprise an electrolyte solution that includes an adsorbent. By applying a voltage across a portion of an electrowetting pixel of an electrowetting display, wetting properties of a surface may be modified so that the surface becomes increasingly hydrophilic. As one example of an electrowetting display, the modification of the surface tension acts as an optical switch by contracting a colored oil film if a voltage is applied to individual pixels of the display. If the voltage is absent, the colored oil forms a continuous film within a pixel, and the color may thus be visible to a user of the display. On the other hand, if the voltage is applied to the pixel, the colored oil is displaced and the pixel becomes transparent. If multiple pixels of the display are independently activated, the display may present a color or grayscale image. The pixels may form the basis for a transmissive, reflective, or transmissive/reflective (transreflective) display. Further, the pixels may be responsive to high switching speeds (e.g., on the order of several milliseconds), while employing small pixel dimensions. Accordingly, the electrowetting displays herein may be suitable for applications such as displaying video content.

Of course, while several different examples have been given, it is to be appreciated that the reflective displays described herein may comprise any other type of electronic-paper technology or reflective-display technology, examples of which are provided above. In addition, while some of the examples described above are discussed as rendering black, white, and varying shades of gray, it is to be appreciated that the described techniques apply equally to reflective displays capable of rendering color pixels. As such, the terms "white," "gray," and "black" may refer to varying degrees of color in implementations utilizing color displays. For instance, where a pixel includes a red color filter, a "gray" value of the pixel may correspond to a shade of pink while a "black" value of the pixel may correspond to a darkest red of the color filter. Furthermore, while some examples herein are described in the environment of a reflective display, in other examples, the display 602 may represent a backlit display, examples of which are mentioned above.

In addition to including the display 602, FIG. 6 illustrates that some examples of the device 600 may include a touch sensor component 606 and a touch controller 608. In some instances, at least one touch sensor component 606 resides with, or is stacked on, the display 602 to form a touch-sensitive display (e.g., an electronic paper touch-sensitive display). Thus, the display 602 may be capable of both accepting user touch input and rendering content in response to or corresponding to the touch input. As several examples, the touch sensor component 606 may comprise a capacitive touch sensor, a force sensitive resistance (FSR), an interpolating force sensitive resistance (IFSR) sensor, or any other type of touch sensor. In some instances, the touch sensor component 606 is capable of detecting touches as well as determining an amount of pressure or force of these touches.

FIG. 6 further illustrates that the electronic device 600 may include one or more processors 610 and one or more computer-readable media 612, as well as a front light component 614 (which may alternatively be a backlight component in the case of a backlit display) for lighting the display 602, a cover layer component 616, such as a cover glass or cover sheet, one or more communication interfaces 618 and one or more power sources 620. The communication interfaces 618 may support both wired and wireless connection to various networks, such as cellular networks, radio, WiFi networks, short range networks (e.g., Bluetooth®), infrared (IR), and so forth.

Depending on the configuration of the electronic device 600, the computer-readable media 612 (and other computer-readable media described throughout) is an example of computer storage media and may include volatile and nonvolatile memory. Thus, the computer-readable media 612 may include, but is not limited to, RAM, ROM, EEPROM, flash memory, or other memory technology, or any other medium that may be used to store computer-readable instructions, programs, applications, media items, and/or data which may be accessed by the electronic device 600.

The computer-readable media 612 may be used to store any number of functional components that are executable on the processor 610, as well as content items 622 and applications 624. Thus, the computer-readable media 612 may include an operating system and a storage database to store one or more content items 622, such as eBooks, audio books, songs, videos, still images, and the like. The computer-readable media 612 of the electronic device 600 may also store one or more content presentation applications to render content items on the device 600. These content presentation applications may be implemented as various applications 624 depending upon the content items 622. For instance, the content presentation application may be an electronic book reader application for rending textual electronic books, an audio player for playing audio books or songs, a video player for playing video, and so forth.

In some instances, the electronic device 600 may couple to a cover (not illustrated in FIG. 6) to protect the display (and other components in the display stack or display assembly) of the device 600. In one example, the cover may include a back flap that covers a back portion of the device 600 and a front flap that covers the display 602 and the other components in the stack. The device 600 and/or the cover may include a sensor (e.g., a Hall effect sensor) to detect if the cover is open (i.e., if the front flap is not atop the display and other components). The sensor may send a signal to the front light component 614 if the cover is open and, in response, the front light component 614 may illuminate the display 602. If the cover is closed, meanwhile, the front light component 614 may receive a signal indicating that the cover has closed and, in response, the front light component 614 may turn off.

Furthermore, the amount of light emitted by the front light component 614 may vary. For instance, upon a user opening the cover, the light from the front light may gradually increase to its full illumination. In some instances, the device 600 includes an ambient light sensor (not illustrated in FIG. 6) and the amount of illumination of the front light component 614 may be based at least in part on the amount of ambient light detected by the ambient light sensor. For example, the front light component 614 may be dimmer if the ambient light sensor detects relatively little ambient light, such as in a dark room; may be brighter if the ambient light sensor detects ambient light within a particular range; and may be dimmer or turned off if the ambient light sensor detects a relatively large amount of ambient light, such as direct sunlight.

In addition, the settings of the display 602 may vary depending on whether the front light component 614 is on or off, or based on the amount of light provided by the front light component 614. For instance, the electronic device 600 may implement a larger default font or a greater contrast if the light is off compared to if the light is on. In some instances, the electronic device 600 maintains, if the light is on, a contrast ratio for the display that is within a certain defined percentage of the contrast ratio if the light is off.

As described above, the touch sensor component 606 may comprise a capacitive touch sensor that resides atop the display 602. In some examples, the touch sensor component 606 may be formed on or integrated with the cover layer component 616. In other examples, the touch sensor component 606 may be a separate component in the stack of the display assembly. The front light component 614 may reside atop or below the touch sensor component 606. In some instances, either the touch sensor component 606 or the front light component 614 is coupled to a top surface of a protective sheet 626 of the display 602. As one example, the front light component 614 may include a lightguide sheet and a light source (not illustrated in FIG. 6). The lightguide sheet may comprise a substrate (e.g., a transparent thermoplastic such as PMMA or other acrylic), a layer of lacquer and multiple grating elements formed in the layer of lacquer that function to propagate light from the light source towards the display 602, thus illuminating the display 602.

The cover layer component 616 may include a transparent substrate or sheet having an outer layer that functions to reduce at least one of glare or reflection of ambient light incident on the electronic device 600. In some instances, the cover layer component 616 may comprise a hard-coated polyester and/or polycarbonate film, including a base polyester or a polycarbonate, that results in a chemically bonded UV-cured hard surface coating that is scratch resistant. In some instances, the film may be manufactured with additives such that the resulting film includes a hardness rating that is greater than a predefined threshold (e.g., at least a hardness rating that is resistant to a 3h pencil). Without such scratch resistance, a device may be more easily scratched and a user may perceive the scratches from the light that is dispersed over the top of the reflective display. In some examples, the protective sheet 626 may include a similar UV-cured hard coating on the outer surface. The cover layer component 616 may couple to another component or to the protective sheet 626 of the display 602. The cover layer component 616 may, in some instances, also include a UV filter, a UV-absorbing dye, or the like, for protecting components lower in the stack from UV light incident on the electronic device 600. In still other examples, the cover layer component 616 may include a sheet of high-strength glass having an antiglare and/or antireflective coating.

The display 602 includes the protective sheet 626 overlying an image-displaying component 628. For example, the display 602 may be preassembled to have the protective sheet 626 as an outer surface on the upper or image-viewing side of the display 602. Accordingly, the protective sheet 626 may be integral with and may overlie the image-displaying component 628. The protective sheet 626 may be optically transparent to enable a user to view, through the protective sheet 626, an image presented on the image-displaying component 628 of the display 602.

In some examples, the protective sheet 626 may be a transparent polymer film in the range of 25 to 200 micrometers in thickness. As several examples, the protective sheet may be a transparent polyester, such as polyethylene terephthalate (PET) or polyethylene naphthalate (PEN), or other suitable transparent polymer film or sheet, such as a polycarbonate or an acrylic. In some examples, the outer surface of the protective sheet 626 may include a coating, such as the hard coating described above. For instance, the hard coating may be applied to the outer surface of the protective sheet 626 before or after assembly of the protective sheet 626 with the image-displaying component 628 of the display 602. In some examples, the hard coating may include a photoinitiator or other reactive species in its composition, such as for curing the hard coating on the protective sheet 626. Furthermore, in some examples, the protective sheet 626 may be dyed with a UV-light-absorbing dye, or may be treated with other UV-absorbing treatment. For example, the protective sheet may be treated to have a specified UV cutoff such that UV light below a cutoff or threshold wavelength is at least partially absorbed by the protective sheet 626, thereby protecting the image-displaying component 628 from UV light.

According to some implementations herein, one or more of the components discussed above may be coupled to the display 602 using fluid optically-clear adhesive (LOCA). For example, suppose that the light guide portion of the front light component 614 is to be coupled to the display 602. The light guide may be coupled to the display 602 by placing the LOCA on the outer or upper surface of the protective sheet 626. If the LOCA reaches the corner(s) and/or at least a portion of the perimeter of protective sheet, UV-curing may be performed on the LOCA at the corners and/or the portion of the perimeter. Thereafter, the remaining LOCA may be UV-cured and the front light component 614 may be coupled to the LOCA. By first curing the corner(s) and/or perimeter, the techniques effectively create a barrier for the remaining LOCA and also prevent the formation of air gaps in the LOCA layer, thereby increasing the efficacy of the front light component 614. In other implementations, the LOCA may be placed near a center of the protective sheet 626, and pressed outwards towards a perimeter of the top surface of the protective sheet 626 by placing the front light component 614 on top of the LOCA. The LOCA may then be cured by directing UV light through the front light component 614. As discussed above, and as discussed additionally below, various techniques, such as surface treatment of the protective sheet, may be used to prevent discoloration of the LOCA and/or the protective sheet 626.

While FIG. 6 illustrates a few example components, the electronic device 600 may have additional features or functionality. For example, the device 600 may also include additional data storage devices (removable and/or non-removable) such as, for example, magnetic disks, optical disks, or tape. The additional data storage media, which may reside in a control board, may include volatile and nonvolatile, removable and non-removable media implemented in any method or technology for storage of information, such as computer readable instructions, data structures, program modules, or other data. In addition, some or all of the functionality described as residing within the device 600 may reside remotely from the device 600 in some implementations. In these implementations, the device 600 may utilize the communication interfaces 618 to communicate with and utilize this functionality.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

One skilled in the art will realize that a virtually unlimited number of variations to the above descriptions are possible, and that the examples and the accompanying figures are merely to illustrate one or more examples of implementations.

It will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification are not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

What is claimed is:

1. An electrowetting device comprising:
a bottom support plate and a top support plate positioned above the bottom support plate;
pixel walls that separate pixel regions, and wherein each of the pixel regions includes:
a top electrode disposed on the top support plate;
a hydrophobic layer portion disposed on a pixel electrode;
an electrowetting oil disposed on the hydrophobic layer portion;
an electrolyte solution mixed with an adsorbent comprising particles in a solid state, wherein the electrolyte solution at least partially surrounds the electrowetting oil; and
a pixel electrode disposed on the bottom support plate, wherein the top electrode is electrically coupled to the pixel electrode via the electrolyte solution, wherein applying a voltage between the electrolyte solution and the pixel electrode decreases hydrophobicity of the hydrophobic layer portion to allow the electrolyte solution to move onto the hydrophobic layer portion and substantially displace at least a portion of the electrowetting oil toward an edge of the pixel region.

2. The electrowetting device of claim 1, wherein the adsorbent comprises nano-zeolites.

3. The electrowetting device of claim 1, wherein a refractive index of the adsorbent is at least approximately the same as a refractive index of the electrolyte solution.

4. The electrowetting device of claim 1, wherein the adsorbent comprises particles having average pore sizes in a range from about 3 angstroms up to about 10 angstroms.

5. An electrowetting device comprising:
a first support plate and a second support plate that faces the first support plate;
a first fluid and a second fluid immiscible with the first fluid; and
pixel regions arranged on at least one of the first support plate and the second support plate,
wherein
the second fluid at least partially fills a space between the first support plate and the second support plate, and
the second fluid includes a substantially adsorbent material that comprises at least one of a plurality of pores or a plurality of channels, the at least one of the plurality of pores or the plurality of channels being permeable to at least one of liquids or gases.

6. The electrowetting device of claim 5, wherein the substantially adsorbent material comprises nano-zeolites.

7. The electrowetting device of claim 6, wherein the nano-zeolites comprise water.

8. The electrowetting device of claim 6, wherein a concentration of the nano-zeolites in the second fluid is less than about 10 grams per liter.

9. The electrowetting device of claim 5, wherein a refractive index of the substantially adsorbent material is at least approximately the same as a refractive index of the second fluid.

10. The electrowetting device of claim 5, wherein the substantially adsorbent material comprises a core-shell material that includes particles that are a porous silicate core surrounded by a porous inorganic shell.

11. The electrowetting device of claim 5, wherein the substantially adsorbent material comprises a composite material including a mixture of porous inorganic particles and a porous organic polymer.

12. The electrowetting device of claim 5, wherein the second fluid comprises an electrolyte solution, and wherein the electrolyte solution and the substantially adsorbent material comprise a colloidal suspension.

13. A method for fabricating at least a portion of an electrowetting device, the method comprising:
placing a fluid on a first support plate, wherein
the fluid includes a substantially adsorbent material having a refractive index that is approximately the same as a refractive index of the fluid, and
the first support plate includes a first electrode layer and a hydrophobic layer on the first electrode layer; and
placing a second support plate over the fluid, wherein the second support plate includes a second electrode layer.

14. The method of claim 13, wherein placing the fluid on the first support plate comprises:
dispensing the fluid including the substantially adsorbent material from a fluid dispenser onto the hydrophobic layer.

15. The method of claim 13, wherein the substantially adsorbent material comprises nano-zeolites.

16. The method of claim 15, wherein the nano-zeolites have average pore sizes in a range from about 3 angstroms up to about 10 angstroms.

17. The method of claim 15, wherein the nano-zeolites have average particle-sizes in a range from about 40 nanometers up to about 300 nanometers.

18. The method of claim 15, wherein a concentration of the nano-zeolites in the fluid is less than about 10 grams per liter.

19. An electrowetting device comprising:
a first support plate and a second support plate that faces the first support plate;
a fluid and an electrolyte solution immiscible with the fluid; and
pixel regions arranged on at least one of the first support plate and the second support plate, wherein
the electrolyte solution at least partially fills a space between the first support plate and the second support plate, and
the electrolyte solution includes a substantially adsorbent material, wherein the electrolyte solution and the substantially adsorbent material comprise a colloidal suspension.

20. A method for fabricating at least a portion of an electrowetting device, the method comprising:
placing a fluid on a first support plate, wherein
the fluid includes nano-zeolites, and
the first support plate includes a first electrode layer and a hydrophobic layer on the first electrode layer; and
placing a second support plate over the fluid, wherein the second support plate includes a second electrode layer.

* * * * *